US008690362B2

(12) United States Patent
Wendt

(10) Patent No.: US 8,690,362 B2
(45) Date of Patent: Apr. 8, 2014

(54) METHOD OF CONTROLLING THE LIGHTING OF A ROOM IN ACCORDANCE WITH AN IMAGE PROJECTED ONTO A PROJECTION SURFACE

(75) Inventor: Matthias Wendt, Wuerselen (DE)

(73) Assignee: Koninklijke Philips N.V., Eindhoven (NL)

( * ) Notice: Subject to any disclaimer, the term of this patent is extended or adjusted under 35 U.S.C. 154(b) by 366 days.

(21) Appl. No.: 12/530,544

(22) PCT Filed: Mar. 10, 2008

(86) PCT No.: PCT/IB2008/050855
§ 371 (c)(1),
(2), (4) Date: Sep. 9, 2009

(87) PCT Pub. No.: WO2008/110973
PCT Pub. Date: Sep. 18, 2008

(65) Prior Publication Data
US 2010/0110387 A1    May 6, 2010

(30) Foreign Application Priority Data
Mar. 13, 2007 (EP) ..................................... 07104045

(51) Int. Cl.
*G03B 21/00* (2006.01)
(52) U.S. Cl.
USPC .......................................... 353/122; 250/205
(58) Field of Classification Search
USPC ..................... 353/122, 121, 20; 250/205, 214
See application file for complete search history.

(56) References Cited

U.S. PATENT DOCUMENTS

| 5,570,138 | A | 10/1996 | Baron |
| 6,606,130 | B1 | 8/2003 | George |
| 6,611,297 | B1 | 8/2003 | Akashi et al. |
| 8,130,184 | B2 * | 3/2012 | Garner et al. .................... 345/84 |
| 8,233,033 | B2 * | 7/2012 | Aarts et al. ........................ 348/51 |
| 2003/0214640 | A1 * | 11/2003 | Kimura et al. ................. 353/122 |
| 2005/0041164 | A1 | 2/2005 | Sato |

FOREIGN PATENT DOCUMENTS

| EP | 1551178 A1 | 7/2005 | |
| JP | 05107638 A * | 4/1993 | ............. G03B 21/00 |
| WO | 2004112386 A1 | 12/2004 | |
| WO | 2006003604 A1 | 1/2006 | |

\* cited by examiner

Primary Examiner — Francis M Legasse, Jr.
Assistant Examiner — Jerry Brooks
(74) Attorney, Agent, or Firm — John Salazar; Mark Beloborodov

(57) ABSTRACT

The invention describes a method of controlling a lighting of a room (1) in accordance with a still or moving image (2) projected onto a projection surface (3s), which method comprises optically measuring a number of characteristic features (f) of the projected image and adjusting the room lighting of the room on the basis of the measured characteristic features (f). Furthermore, the invention relates to a system for controlling the lighting of a room (1) in accordance with an image (2) projected onto a projection surface (3s), to a control device (9) for use in such a system, and to a projection screen device (3) for use in such a system. Moreover, the invention relates to a room lighting system (1) for lighting of a room in accordance with an image (2) projected onto a projection surface (3s).

4 Claims, 2 Drawing Sheets

METHOD OF CONTROLLING THE LIGHTING OF A ROOM IN ACCORDANCE WITH AN IMAGE PROJECTED ONTO A PROJECTION SURFACE

FIELD OF THE INVENTION

The invention relates to a method of controlling the lighting of a room in accordance with an image projected onto a projection surface. The invention further relates to a control system for controlling the lighting of a room in accordance with an image projected onto a projection surface and to a control device and to a projection screen device for use in such a system. Moreover, the invention relates to a room lighting system for lighting of a room in accordance with an image projected onto a projection surface.

BACKGROUND OF THE INVENTION

Standard image projection setups are limited to projecting an image to a projection surface whilst leaving the surrounding area dark. PCT/WO 2004/112386 A1 describes a device for illuminating the area surrounding a projection screen on the basis of the image data. This illumination allows for more pleasant viewing and generates the sensation of the image being extended beyond the actual projection area. Also, US 2005/004164 A1 describes a device which causes areas in the vicinity of the projection screen to be illuminated on the basis of the image displayed. This arrangement makes use of the fact that a human viewer is only able to perceive details inside a region given by a narrow angle about his current viewing direction. Accordingly, illuminated areas outside of the normal viewing angle are sufficient to augment the sense of presence of the video projected onto the projection screen.

However, these devices require either specifically designed projection units or at least a control signal derived from the video signal itself.

It is an object of the invention to provide a simple way to illuminate the surrounding of a projection surface on the basis of the image projected onto that surface, without having to intercept the video signal and without requiring alterations to the projection unit.

SUMMARY OF THE INVENTION

To this end, the invention presents a method of controlling a lighting of a room in accordance with a still or moving image projected onto a projection surface, which method comprises optically measuring a number of characteristic features of the projected image and adjusting the room lighting on the basis of the measured characteristic features. A projection surface may be any surface on which the image is projected, for example a dedicated projection screen, a white wall or backdrop, or a "virtual" projection screen formed by artificial fog etc.

An obvious advantage of the method described above is that any existing projection equipment can be used, since the adjusting of the room lighting is done on the basis of measuring the output of the projector, i.e. the projected image itself, without having to evaluate the underlying video signal or modify the optical output characteristics of the projector to generate the ambient lighting.

An appropriate system implementing a method for controlling the lighting of a room in accordance with an image projected onto a projection surface comprises a number of optical sensors to measure a number of characteristic features of the projected image, a control unit for generating a control signal for a lighting arrangement, comprising a number of lighting devices, on the basis of the measured characteristic features, and an interface for transmitting the control signals generated by the control unit to the lighting arrangement.

This system can be seamlessly integrated into an existing projection system by either only adding some specific components or replacing some specific components. Advantageously, the projector may be left entirely unaltered. An existing projection screen can be equipped with optical sensors or, alternatively, the system may include a specifically designed sensor-equipped projection screen.

The control device for use in such a system controlling the lighting of a room in accordance with an image projected onto a projection surface accordingly comprises an input interface for receiving signals of the optical sensors, which signals carry information about a number of characteristic features of the projected image, and a control unit for generating a control signal for a lighting arrangement on the basis of the measured characteristic features. The control device further comprises an output interface for transmitting the generated control signal.

Beneficially, the control device can be a stand-alone component that can be used to extend or augment an existing system once it has been equipped with optical sensors to generate the required input electrical signals.

A projection screen device preferably used in such a system comprises optical sensors on or behind the projection surface for measuring characteristic features of the image projected onto the projection surface. Such a projection screen device can be used as a replacement for a previous projection screen, while beneficially allowing the more expensive parts of the projection system to be kept, in particular the projector itself, and allowing its installation to remain unaltered.

For using such a projection screen device with an above mentioned independent control device for use in a system for controlling the lighting of a room, the projection screen device should comprise an output interface to the control unit for transmitting the signals of the optical sensors. Alternatively, the projection screen device may also contain the control unit and/or a lighting arrangement.

A room lighting system according to the invention for lighting of a room in accordance with an image projected onto a projection surface comprises a number of optical sensors to measure a number of characteristic features of the projected image, a control unit for generating a control signal for a lighting arrangement on the basis of the measured characteristic features, and a number of light sources reacting to the control signal. Such a room lighting system may be completely integrated in a single room lighting device which can advantageously be used as an add-on to an existing system by simply positioning or placing the optical sensors on or behind the projection surface. Alternatively, this system may be built up from the components mentioned above, in particular the projection screen device, the control unit, and a number of appropriate light sources.

The dependent claims and the subsequent descriptions disclose particularly advantageous embodiments of the invention.

Characteristic features which are measured can be a number of luminous intensity and/or colour values of the projected image. Colour as perceived by the human eye is determined by the wavelengths contained in the light captured by the eye. Since each colour can be generated by combining a red, a green and a blue component with individual intensity, a colour can be described as a combination of three values, one value representing the red, one value representing the green and one value representing the blue component. Such descriptions are commonly used and often referred to as RGB values. RGB values can also describe luminous intensity. Low absolute RGB values indicates low luminous intensity, a high absolute value indicates high luminous intensity. Thus, this scheme can be used to describe the characteristic features of the image. A number of different schemes exist for describing light in that manner and, since these will be familiar to a person skilled in the art, they need not be described in more detail here. Preferably, the dominant colours of the image or of specific areas of the image are used as the characteristic features for controlling the ambient light of the projection surface.

Measurement of the characteristic features of the image projected onto the projection surface can be done electro-optically, which covers all methods of capturing optical characteristics and transforming them into electrical signals. This keeps the input interface at the control unit simple, and allows for easy further processing of the measured data. Therefore, the term "optical sensor" comprises all kinds of sensor capable of capturing the necessary optical characteristics, in particular electro-optical sensors, like photodiodes etc. The light sensor could be connected to the control unit by wire or in a wireless manner. In a wireless embodiment, the sensor could be made self-powered by means of a solar cell that collects the energy from the projector or from the ambient room light.

In a preferred embodiment, the measurement is performed on the projection surface or behind the projection surface.

For measuring the characteristic features behind the projection screen, i.e. on the side of the screen opposite to the projector, in a preferred embodiment at least areas of the projection surface are transparent or partially transparent. Generally, it is desirable that projection light does not pass through the projection screen. Therefore, some backs of some projection screens are coated with black material. To retain this beneficial characteristic, the screen can be coated in the usual manner while excluding the areas where the optical sensors are to be positioned, which areas are left uncoated. The sensors can be realized such that they do not allow light to pass through, thereby achieving an overall opaque or non-transparent screen when these are positioned at the back of the screen. Sensor areas may be laminated with the screen foil.

An existing projection screen may be equipped with optical sensors behind the screen and left unaltered if the screen has sufficient transparency or translucency.

The measurement of characteristic features can be done continuously over time to optimally follow a moving image. It can also be performed at one point in time for a still image, or at discrete points in time, e.g. in predefined intervals.

In a preferred embodiment, a number of zones or regions of the area surrounding the projection screen are illuminated individually on the basis of the measured characteristic features. The surrounding area can be a wall behind or beneath the projection surface, but also any other medium capable of being illuminated like e.g. artificial fog or dry ice.

In such an embodiment, the zones in the surrounding area can be controlled in colour and luminous intensity to match the adjacent areas at the edges of the projected images. This can be achieved by performing the measurement of the characteristic features in areas at the edges of the projection screen adjacent to the target zone subject to individual illumination.

As mentioned already, the human eye cannot perceive details outside the centre of the viewing area. Hence zones simply illuminated with one colour matching the part of the projected image at the adjacent edge of the projection screen generate a sense of extension of the image beyond the actual projection area, significantly enhancing the viewer experience.

In a simple embodiment, each measuring area is represented by just one measuring point. To achieve a better measurement of characteristic features, more measuring points or even an approximately continuous measuring area like a CCD sensor can be used.

In a further embodiment, optical sensors not only measure the characteristic features of the image but also the characteristic features of the room lighting, and the control signal is generated on the basis of the measurement of the projected image and the room lighting. Closed loop control can be used to precisely adjust the room lighting. The technique of closed loop control will be known to a person skilled in the art and does not need to be explained in detail here.

Additional optical sensors may be used for measuring the room lighting. In an improved embodiment, the optical sensors used for measuring the projected image are also used for measuring the room lighting. For this purpose, the control unit has to switch off the room lighting, for example periodically, to enable measuring of the projected image without spurious light from the environment disturbing the measurement.

The room lighting system according to the invention preferably comprises specifically designed lighting devices which can be adjusted according to a variety of output characteristics, such as for example the colour of the light, corresponding to the control signal received on an input interface of the lighting device compatible with the output interface of the control unit.

Therefore, a lighting device for use in such a system is preferably capable of generating light in any desired colour and intensity. As outlined above, any colour can be generated by combining red, green and blue light, thus an embodiment of a lighting device can comprise three light sources individually controllable in terms of intensity, where one light source is equipped with a red colour filter, one light source is equipped with a green colour filter and one light source is equipped with a blue filter. Also, any other colour model for mixing colours from basic colours, for example with yellow, magenta and cyan light may be used. Instead of using filters for producing coloured light from, for example, white light sources, any light sources directly producing coloured light may be used. Light sources can be lamps or LEDs, lasers, etc. In a preferred embodiment OLEDs are used as a source of light.

In a preferred embodiment, light sources for wall washing are used. In this embodiment, the lighting unit is advantageously placed behind the projection screen, thus hiding it from the viewer while illuminating the walls surrounding the projection screen as seen from the viewer. Instead of, or in addition to, wall washers, direct view lamps (like origami luminaires) could be placed around the projection area and possibly also integrated with the projection screen to obtain a screen module. A particularly preferred variation is a lighting arrangement in the form of an illuminated frame which extends along the projection surface, completely or partially, for example on two sides of the projection surface. This could be realised, for example, as a frame of transparent material that can be lit with coloured light from within, and/or a frame comprising an arrangement of OLEDs. The illuminated frame can also be realised by combining several frame elements, each comprising one or more separate lamps. These can be controlled in combination, as a group, or independently of each other.

The lamps, for example the "wall washers" or other lamps mentioned above, in particular the elements of the illuminated frame, are preferably operated independently of each other, because, for instance, each washer lamp can have an internal target colour setting and does not need to know what other light sources in the room are doing. To this end, the relevant lamps can be equipped with their own sensors and control modules, so that they need only be plugged into the power supply and switched on. A user could first, for example, buy and install only two lamp elements, for an illuminated frame, that operate independently of each other. At some later point in time, he can purchase and installed more lamps in order to extend or augment the frame and to achieve a brighter and finer lighting effect.

Lighting devices reacting to the control signals of the control unit may also be existing lighting equipment such as the room lighting, fitted with an adaptor for the output interface of the control unit as described above. The room lighting may in this case just be dimmed for dark images projected to the screen.

In this case, the lighting control system may preferably be a central control system, which has means to set appropriate control values for the related light sources in the room. For instance, general light or ceiling washers can be controlled in conjunction with wall washers.

As mentioned above, a projection screen device which comprises optical sensors on or behind the projection surface is preferably used for measuring characteristic features of the projected image.

In a further preferred embodiment, the projection screen device can be rolled up, and the roller housing contains the control unit, and is advantageously equipped with lighting units responding to the control signals of the control unit that may also be incorporated in the roller housing.

An unrolling of the screen can preferably be triggered by signals detected by the optical sensors. To this end, the sensors of a rollable screen, attached to a wall or a ceiling of a room, may also be mounted on the wall at locations which are behind the projection screen, when the screen is in its unrolled state Other objects and features of the present invention will become apparent from the following detailed descriptions of example embodiments considered in conjunction with the accompanying drawing. It is to be understood, however, that the drawings are designed solely for the purposes of illustration and not as a definition of the limits of the invention.

DETAILED DESCRIPTION OF THE EMBODIMENTS

Figure 1:
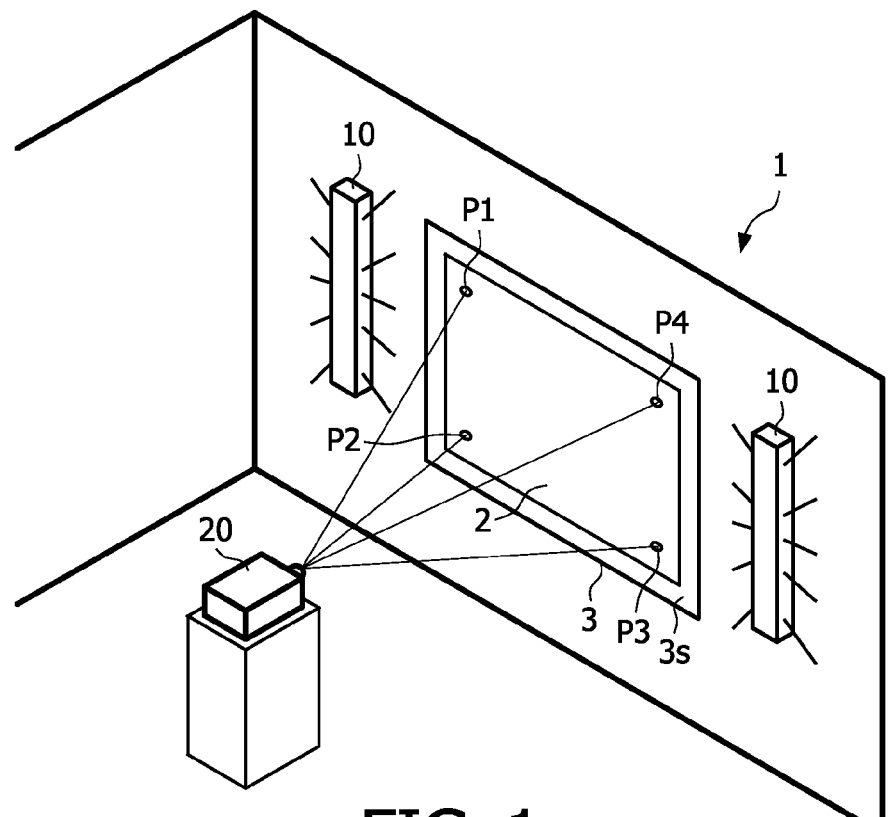
FIG. 1 shows a schematic overview of a room lighting system according to a first embodiment of the invention.
Figure 2:
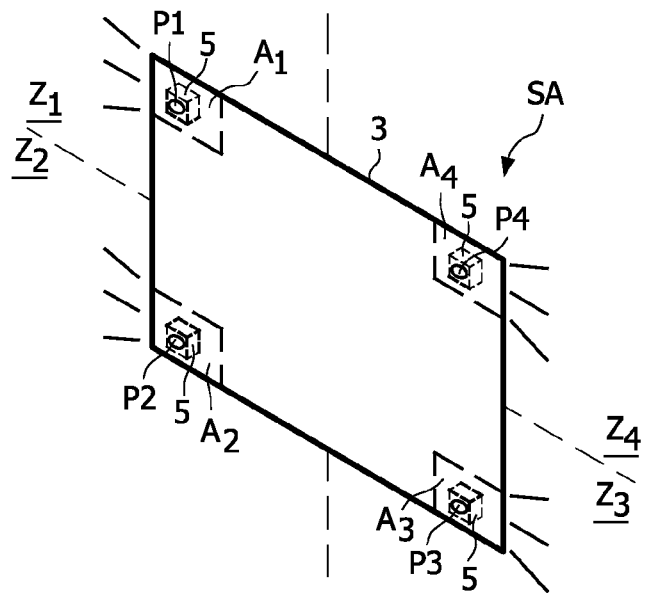
FIG. 2 shows a projection screen used in the system of FIG. 1.

FIG. 1 shows a system 1 for controlling the lighting of a room in accordance with an image 2 projected onto a projection surface 3s of a projection screen device 3. As a projection unit 20, any apparatus can be used that is designed to project images onto a screen. The projection screen 3 contains four measuring points $P_1$, $P_2$, $P_3$, $P_4$ at the edges of the screen at which optical sensors measure characteristic features of the image 2 projected onto the projection screen 3. In FIG. 2, the projection screen device 3 of the system 1 is shown in more detail. Behind each of the four measuring points $P_1$, $P_2$, $P_3$, $P_4$ a sensor 5 is mounted on a wall in the direction of projection. The screen of the projection screen device 3 is semitransparent at the measuring points $P_1$, $P_2$, $P_3$, $P_4$, and light from the projected image 2 passes through the projection screen to the optical sensors 5 which measure characteristic features of the light passing through.

A control unit, not shown in FIGS. 1 and 2, generates a control signal for the room lighting which reacts accordingly. The room lighting can be a pair of wall washers 10, i.e. lighting devices 10 for evenly illuminating vertical surfaces (FIG. 1). This technique will be known to a person skilled in the art and does not need to be described in more detail here. Each lighting device illuminates a zone of a "surrounding area" SA of the projection surface, e.g. of the wall behind the projection screen, on the basis of the measurement of the optical sensor 5. The lighting devices 10 may also be hidden behind the projection screen 3 so that they are not visible from the normal view of a user.

The measuring of the characteristic features of the light at different measuring points $P_1$, $P_2$, $P_3$, $P_4$ has the advantage that different characteristic features may be acquired for different measuring areas $A_1$, $A_2$, $A_3$, $A_4$ of the image 2. For example, in the embodiment of FIG. 2, in each of the measuring areas $A_1$, $A_2$, $A_3$, $A_4$ at the four edges of the image 2 a dominant colour of the respective measuring area $A_1$, $A_2$, $A_3$, $A_4$ is determined. According to this dominant colour, the corresponding zones $Z_1$, $Z_2$, $Z_3$, $Z_4$ of the surrounding area SA at the edges of the projecting surface $3s$ are illuminated with light in a similar colour.

Figure 3:
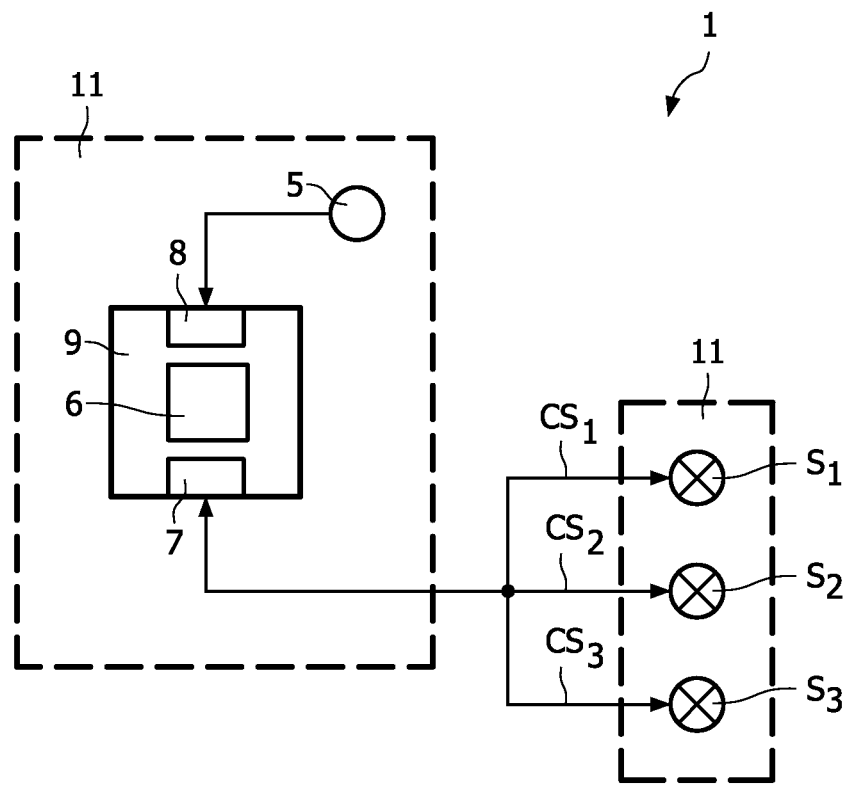
FIG. 3 shows a schematic diagram of the functional components of the system according to FIG. 1.

The functional components of the lighting system 1 are shown in FIG. 3 in a schematic block diagram. An electro-optical sensor 5 is connected to an input interface 8 of a control device 9 to feed electrical signals generated by the sensor 5, comprising or representing the characteristic features of the light received by the sensor 5, to the control device 9. This control device 9 comprises a control unit 6 which analyses the electrical signal and extracts characteristic features like luminous intensity and colour, e.g. as a RGB value. The control unit 6 generates control signals $CS_1$, $CS_2$, $CS_3$ which can for instance drive the light sources $S_1$, $S_2$, $S_3$ of a lighting device 10 connected on an outgoing interface 7 of the control device 9 such that the light emitted by the lighting device 10 matches the measured characteristic features. The light sources $S_1$, $S_2$, $S_3$ can be three lamps, where the first lamp $S_1$ is equipped with a red colour filter, the second lamp $S_2$ with a green filter and the third lamp $S_3$ with a blue filter, so that different colours and colour intensities can be produced by controlling the light output of the lamps $S_1$, $S_2$, $S_3$ individually with the control signals $CS_1$, $CS_2$, $CS_3$. The lighting device 10 could, for instance produce a red light of high luminous intensity by only activating the lamp $S_1$ with the red filter but with high output power. A yellow light can be achieved by activating the lamp $S_1$ with the red filter and additionally activating the lamp $S_2$ with the green filter, since red and green light combine to give light of a yellow colour. High and low intensity light of a colour can be achieved by increasing and decreasing output power of the lamps $S_1$, $S_2$, $S_3$ equally, i.e. balancing the relative intensity. For instance a bright yellow can be achieved by combining bright red and bright green light; a dark yellow light can be achieved by combining by low red and low green light. The combination of light with red, green and yellow components at certain intensities then yields a defined colour emitted by the lighting device 10. Here, the sensor 5 and the control device 9 give a control system 11 according to an embodiment of the invention to control any lighting arrangement.

Figure 4:
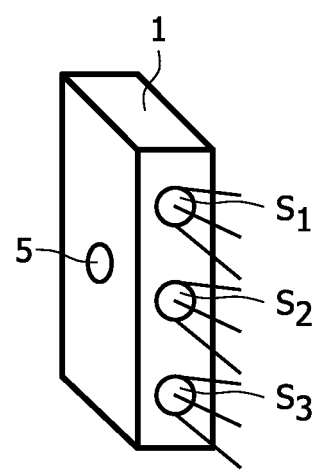
FIG. 4 shows a room lighting system according to a second embodiment of the invention in the form of a stand-alone unit comprising an optical sensor and light sources.

Such a lighting system 10 may also be completely integrated in a single stand-alone device as shown in FIG. 4. Here, in a common housing 12, all components shown in FIG. 3, an optical sensor 5, a control unit 6 and light sources $S_1$, $S_2$, $S_3$, are integrated.

As before, each lamp $S_1$, $S_2$, $S_3$ can be assigned to one of the colours red, green and blue and the control signals $CS_1$, $CS_2$, $CS_3$ drives the lamps $S_1$, $S_2$, $S_3$ individually to output certain intensity. For example, such a stand alone lighting system 10 may be used behind the four edges of a projection screen similar to FIG. 2 in order to independently illuminate the zones $Z_1$, $Z_2$, $Z_3$, $Z_4$ of the surrounding area SA at the different edges of the screen with a light adapted to the dominant colour of the image 2 in the corresponding measuring areas $A_1$, $A_2$, $A_3$, $A_4$.

For the sake of clarity, it is to be understood that the use of "a" and "an" throughout this application does not exclude a plurality, and "comprising" does not exclude other steps or elements. A "unit" or "module" can comprise a number of units or modules, unless otherwise stated.

The invention claimed is:

1. A method of controlling a lighting of a room in accordance with an image projected by a projector onto a dedicated projection screen, which method comprises:
controlling, at a control unit that is autonomous from the projector, a plurality of lighting devices in a lighting arrangement in the room;
measuring a number of characteristic features of the projected image on or behind the projection screen using a plurality of sensors coupled with the control unit to measure luminous intensity and color;
adjusting, by the control unit, the lighting devices of the room based at least in part on the measured characteristic features;
projecting in an area surrounding the projection screen with light of a color and luminous intensity matching adjacent areas at the edges of the projected image;
wherein a number of zones of a surrounding area of the projection screen are illuminated individually by one of the lighting devices on the basis of the measured features;
wherein said measurements of the characteristic features are performed in specific measuring areas at the edges of the projection screen and the zones of the surrounding area adjacent to the specific measuring areas are illuminated on the basis of the measurements at the specific areas;
wherein, in a first phase, the room lighting is off, and measurement of the characteristic features of the image is performed, and
wherein, in a second phase, the room lighting is on, and measurement of characteristic features of the room lighting is performed, and
wherein an adjustment of the room lighting is carried out on the basis of the measurements performed in both first and second phases.

2. A method of claim 1 wherein the measurement in each specific area is performed at a number of discrete measuring points in this specific area.

3. A system for controlling a lighting of a room in accordance with an image projected onto a transparent projection screen, comprising:
a plurality of optical sensors for measuring a plurality of characteristic features of the projected image generated by an image projector at a plurality of different measuring points behind the projection screen;
a control unit autonomous from the image projector and coupled with the plurality of optical sensors for generating a control signal for a lighting device having a plurality lighting emitters on the basis of the measured characteristic features;
an output interface for transmitting the control signals to the lighting device;
the control signals operable to configure said lighting device to illuminate a plurality of zones, each of said plurality of zones adjacent to a respective said different measuring points;
wherein said illumination of each said plurality of zones is based upon a dominant color measured at said respective measuring point such that the lighting device illuminates the zones in a corresponding color and luminous intensity to substantially match the measured characteristic features.

4. A method for controlling a lighting system of a room, comprising:
projecting an image onto a dedicated projection screen;
operating a lighting system control unit that is autonomous from a projector projecting the image to control a plurality of lighting devices in the lighting system of the room;
measuring a number of characteristic features by a plurality of optical sensors coupled with the lighting system control unit, the characteristic features including luminous intensity and color values of the projected image;
allowing aspects of the projected image to pass through a plurality of transparent areas of the dedicated projections screen by providing at least a partially transparent dedicated projection screen at the areas;
positioning the plurality of sensors at the plurality of transparent areas and behind the projection screen;
modifying, by the lighting system control unit, the lighting system based upon the measured characteristics such that a plurality of zones of a surrounding area of the dedicated projection screen are illuminated individually on the basis of the measured characteristic features.

* * * * *